US005932253A

United States Patent [19]

Trinh et al.

[11] Patent Number: 5,932,253

[45] Date of Patent: Aug. 3, 1999

[54] FABRIC SOFTENING COMPOSITIONS WITH DYE TRANSFER INHIBITORS FOR IMPROVED FABRIC APPEARANCE

[75] Inventors: Toan Trinh, Maineville; Stephanie Lin-Lin Sung, Cincinnati; Helen Bernardo Tordil, West Chester; Paul Arthur Wendland, Cincinnati, all of Ohio

[73] Assignee: The Procter & Gamble Company, Cincinnati, Ohio

[21] Appl. No.: 08/873,787

[22] Filed: Jun. 12, 1997

Related U.S. Application Data

[62] Division of application No. 08/209,694, Mar. 10, 1994, Pat. No. 5,804,219, which is a continuation of application No. 07/976,781, Nov. 16, 1992, abandoned.

[51] Int. Cl.[6] .............................. A01N 59/00; H01B 1/02

[52] U.S. Cl. ......................... 424/719; 252/8.81; 252/515; 252/519

[58] Field of Search .................................... 252/8.81, 515, 252/519; 424/719

[56] References Cited

U.S. PATENT DOCUMENTS

| | | | |
|---|---|---|---|
| 3,932,295 | 1/1976 | Fujino et al. | 252/102 |
| 4,006,092 | 2/1977 | Jones | 252/95 |
| 4,252,656 | 2/1981 | Liebowitz et al. | 252/8.8 |
| 4,634,544 | 1/1987 | Weber et al. | 252/99 |
| 4,764,289 | 8/1988 | Trinh | 252/8.6 |
| 4,873,294 | 10/1989 | O'Lenick et al. | 525/419 |
| 4,954,292 | 9/1990 | Hall et al. | 252/542 |

FOREIGN PATENT DOCUMENTS

| | | | |
|---|---|---|---|
| 3519012 | 11/1986 | Germany . | |
| 0256696 A1 | 2/1988 | Germany | C11D 3/00 |
| 0265257 A2 | 4/1988 | Germany | C11D 3/37 |
| 262897 A2 | 4/1988 | Germany | C11D 1/83 |
| 0312277 A2 | 4/1989 | Germany | C11D 17/04 |
| 0320219 A1 | 6/1989 | Germany | C11D 17/00 |
| 3840056 A1 | 5/1990 | Germany | D06L 1/12 |
| 0382464 A2 | 8/1990 | Germany | C11D 17/00 |
| 0462806 A2 | 12/1991 | Germany | C11D 3/40 |
| 49-93676 | 9/1974 | Japan . | |
| 59-6299 | 1/1984 | Japan | C11D 3/30 |
| 61-28596 | 2/1986 | Japan | C11D 3/37 |
| 63-245497 | 10/1988 | Japan . | |
| A 1079388 | 8/1967 | United Kingdom | C11D 1/72 |

OTHER PUBLICATIONS

J. Med. Chem., 40, 2525, MacPherson et al. (1997).

*Primary Examiner*—Dwayne C. Jones
*Attorney, Agent, or Firm*—Robert B. Aylor

[57] ABSTRACT

The present invention relates to compositions and processes which incorporate water-soluble polymers, other than enzymes, containing ═N—C(═O)— (including PVP) and/or N-oxide groups into the wash, rinse, and/or drying cycle of a laundering process (e.g., via fabric softening compositions) for dye transfer inhibition in the subsequent wash cycle. Multiple wash cycles optimize the dye transfer inhibitor performance of these polymers, remove unwanted dye discoloration caused by dye transfer, and provide soil antiredeposition benefits.

20 Claims, No Drawings

FABRIC SOFTENING COMPOSITIONS WITH DYE TRANSFER INHIBITORS FOR IMPROVED FABRIC APPEARANCE

This is a division of application Ser. No. 08/209,694, filed on Mar. 10, 1994 now U.S. Pat. No. 5,804,219, which is a continuation of application Ser. No. 07/976,781 filed Nov. 16, 1992, now abandoned on Mar. 10, 1994.

TECHNICAL FIELD

The present invention relates to compositions and processes useful for inhibiting the transfer of dyes, released into laundering solution from colored fabrics, from one fabric to another.

BACKGROUND ART

One troublesome and persistent problem during laundering operations is the tendency of some colored fabrics to release dye into the laundering solution which dye is then transferred onto other fabrics.

Manufacturers use many types of dye to color fabrics. Common fabric dyes include direct dyes used primarily to color cotton and rayon, acid dyes used primarily on nylon, wool, and silk, disperse dyes used primarily on polyester, nylon, and Spandex, azo dyes used primarily on cotton, rayon, and silk, reactive dyes used primarily on cotton and rayon, and vat dyes used primarily on cotton. Direct, acid and disperse dyes are in general readily released into washing solution while azo and vat dyes are not. When properly applied, reactive dyes chemically bond to cellulose and therefore are not readily solubilized; however, if improperly applied, reactive dyes may also release into the wash solution. Cotton, nylon, rayon and Spandex fabrics have a strong propensity to pick up solubilized or suspended dyes from solution, while polyester fabrics pick up such dyes to a lesser extent.

In the laundry operation, especially the operation involving automatic washing machines, dye transfer occurs mainly during the wash cycle, and very seldom, if at all, during the rinse cycle. Dye transfer during the wash cycle is caused by higher water temperature, longer cycle time, and much higher surfactant concentration in the wash cycle, as compared to the less stringent conditions of the rinse cycle.

Thus, those skilled in the art have focused efforts to inhibit dye transfer by adding dye transfer inhibitors to detergent compositions. For example, European Patent Application 265,257, Clements et al., published Apr. 27, 1988, discloses detergent compositions which prevent dye transfer, containing a detergent active (mixtures of anionic and nonionic are preferred), a detergent builder, and a polyvinylpyrrolidone (PVP) mixture. German Pat. No. 3,519,012, Weber et al., published Nov. 27, 1986, teaches a detergent composition comprising nonionic surfactants, PVP components, water-soluble cationic components, and builders, to prevent dye transfer during the wash.

Dye transfer inhibitors (DTI), such as PVP, appear to solubilize into the wash water to scavenge the free dye molecules, thus suspending the dyes and preventing them from redepositing onto fabrics.

DTI may interact with some detergent actives. For example, detergent compositions containing PVP and anionic surfactants usually have decreased dye transfer inhibition performance compared to those detergents containing PVP and nonionic surfactants. It is believed that anionic surfactants interact with PVP in the wash cycle, and reduce PVP's ability to interact with free dye molecules.

All percentages, ratios, and parts herein are by weight unless otherwise stated.

SUMMARY OF THE INVENTION

The compositions of the present invention preferably incorporate water-soluble polymers containing =N—C(=O)— (including PVP), and/or N-oxide groups into fabric softening compositions to be added to the rinse and/or drying cycles of the laundry operation. Surprisingly, these fabric softening compositions provide effective dye transfer inhibition in the subsequent wash cycle. These water-soluble polymers deposit on fabrics along with softener actives in the rinse or dryer cycle. These DTI polymers remain deposited on fabrics throughout consumer wear so that there is a sufficient concentration, after resolubilization in the subsequent wash solution, to inhibit dye transfer. Non-treated fabrics will also be protected from dye transfer when washed with fabrics previously treated with these softener compositions containing polymeric dye transfer inhibitors. It is also surprising that these polymer compounds in softener compositions show improved efficacy when anionic detergents rather than nonionic detergents are used in the subsequent wash cycle.

Thus, the present invention relates primarily to fabric softening compositions, in liquid, solid, or dryer sheet form, for use in the rinse and/or dryer cycles of home laundry operations. The present invention is based on: (a) the discovery that the incorporation of an effective amount of certain polymeric dye transfer inhibitors (DTI) into liquid, solid, and/or dryer-added fabric softening compositions can effectively inhibit the transfer of dyes from one fabric to another in the subsequent wash cycle; and/or (b) the discovery of a process of incorporating DTI into fabric softener compositions to provide convenient and/or optimal dye transfer inhibition, remove unwanted dye discoloration resulting from previous dye transfer, and/or provide soil anti-redeposition benefit in the wash cycle.

Preferably, and more specifically, fabric softening compositions are provided in the form of liquid, preferably aqueous, compositions comprising:

I. from about 3% to about 50%, preferably from about 4% to about 30%, of fabric softening agent (fabric softener); and II. from about 0.03% to about 25%, preferably from about 0.1% to about 15%, of water-soluble polymeric dye transfer inhibiting agent (dye transfer inhibitor or DTI) selected from the group consisting of:

(A) polymers with one or more monomeric units containing at least one =N—C(=O)— group, which are not enzymes, having an average molecular weight of from about 500 to about 100,000, preferably about 500 to about 40,000, and more preferably from about 1,000 to about 30,000;

(B) polymers with one or more monomeric units containing at least one N-oxide group having an average molecular weight of from about 500 to about 1,000,000, preferably from about 1,000 to about 500,000, more preferably from about 2,000 to about 100,000;

(C) polymers containing both =N—C(=O)— and N-oxide groups of (A) and (B);

(D) mixtures thereof; and

III. the balance comprising a liquid carrier, preferably water; wherein the liquid compositions are essentially free of aerosol propellants. The nitrogen of the =N—C(=O)— group may be bonded to either one or two other atoms (with two single bonds or one double bond).

The present invention also comprises dryer-added fabric softener compositions comprising:

I. from about 50% to about 99%, preferably from about 70% to about 99%, of fabric softening agent;

II. from about 0.2% to about 50%, preferably from about 1% to about 30%, of polymeric dye transfer inhibiting agent selected from (A), (B), (C), and (D), above; and III. optionally, a dispensing means which provides for release of an effective amount of said composition to fabrics.

Solid, particulate fabric softening compositions of the present invention typically comprise:

I. from about 20% to about 90%, preferably from about 30% to about 70%, of fabric softening agent; and II. from about 0.1% to about 80%, preferably from about 0.3% to about 50%, more preferably from about 0.5% to about 25%, of dye transfer Inhibiting agent also selected from (A), (B), (C), and (D), above.

DETAILED DESCRIPTION OF THE INVENTION

LIQUID COMPOSITIONS

Liquid, preferably aqueous, fabric softening compositions typically comprise the following components:

I. an effective amount, preferably from about 3% to about 50%, more preferably from about 4% to about 30%, of fabric softening agent;

II. an effective amount, preferably from about 0.03% to about 25%, more preferably from about 0.1% to about 15%, of polymeric dye transfer inhibiting agent; and III. the balance comprising liquid carrier, preferably, selected from the group consisting of water, $C_1$–$C_4$ monohydric alcohols, $C_2$–$C_6$ polyhydric alcohols, liquid polyalkylene glycols, and mixtures thereof.

I. Fabric Softening Agents

The amount of fabric softening agent (fabric softener) in liquid compositions of this invention is typically from about 3% to about 50%, preferably from about 4% to about 30%, by weight of the composition. The lower limits are amounts needed to contribute effective fabric softening performance when added to laundry rinse baths in the manner which is customary in home laundry practice. The higher limits are suitable for concentrated products which provide the consumer with more economical usage due to a reduction of packaging and distributing costs.

Some preferred compositions are disclosed in U.S. Pat. No. 4,661,269, issued Apr. 28, 1987, in the names of Toan Trinh, Errol H. Wahl, Donald M. Swartley, and Ronald L. Hemingway, said patent being incorporated herein by reference.

Other fabric softeners that can be used herein are disclosed in U.S. Pat. No. 3,861,870, Edwards and Diehl; U.S. Pat. No. 4,308,151, Cambre; U.S. Pat. No. 3,886,075, Bernardino; U.S. Pat. No. 4,233,164, Davis; U.S. Pat. No. 4,401,578, Verbruggen; U.S. Pat. No. 3,974,076, Wiersema and Rieke; and U.S. Pat. No. 4,237,016, Rudkin, Clint, and Young, all of said patents being incorporated herein by reference.

One suitable fabric softener (Component I) is a mixture comprising:

(a) from about 10% to about 80% of the reaction product of higher fatty acids with a polyamine selected from the group consisting of hydroxyalkylalkylenediamines and dialkylenetriamines and mixtures thereof;

(b) from about 3% to about 40% of cationic nitrogenous salts containing only one long chain acyclic aliphatic $C_{15}$–$C_{22}$ hydrocarbon group; and (c) from about 10% to about 80% of cationic nitrogenous salts having two or more long chain acyclic aliphatic $C_{15}$–$C_{22}$ hydrocarbon groups or one said group and an arylalkyl group;

said (a), (b) and (c) percentages being by weight of Component I.

Following are the general descriptions of the above softener ingredients including certain specific examples. These examples illustrate, but do not limit the present invention.

Component I(a)

A preferred softening agent (active) of the present invention is the reaction products of higher fatty acids with a polyamine selected from the group consisting of hydroxyalkylalkylenediamines and dialkylenetriamines and mixtures thereof. These reaction products are mixtures of several compounds in view of the multifunctional structure of the polyamines.

The preferred Component I(a) is a nitrogenous compound selected from the group consisting of the reaction product mixtures or some selected components of the mixtures. More specifically, the preferred Component I(a) is compounds selected from the group consisting of:

(i) the reaction product of higher fatty acids with hydroxyalkylalkylenediamines in a molecular ratio of about 2:1, said reaction product containing a composition having a compound of the formula:

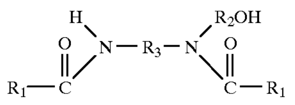

wherein $R_1$ is an acyclic aliphatic $C_{15}$–$C_{21}$ hydrocarbon group and $R_2$ and $R_3$ are divalent $C_1$–$C_3$ alkylene groups;

(ii) substituted imidazoline compounds having the formula:

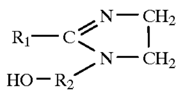

wherein $R_1$ and $R_2$ are defined as above;

(iii) substituted imidazoline compounds having the formula:

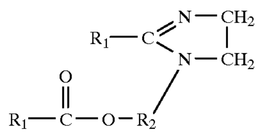

wherein $R_1$ and $R_2$ are defined as above;

(iv) the reaction product of higher fatty acids with dialkylenetriamines in a molecular ratio of about 2:1, said reaction product containing a composition having a compound of the formula:

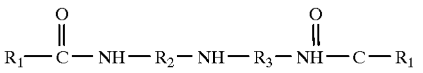

wherein $R_1$, $R_2$ and $R_3$ are defined as above; and (v) substituted imidazoline compounds having the formula:

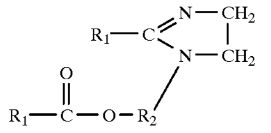

wherein $R_1$ and $R_2$ are defined as above; and (vi) mixtures thereof.

Component I(a)(i) is commercially available as Mazamide® 6, sold by Mazer Chemicals, or Ceranine® HC, sold by Sandoz Colors & Chemicals; here the higher fatty acids are hydrogenated tallow fatty acids and the hydroxyalkylalkylenediamine is N-2-hydroxyethylethylenediamine, and $R_1$ is an aliphatic $C_{15}$–$C_{17}$ hydrocarbon group, and $R_2$ and $R_3$ are divalent ethylene groups.

An example of Component I(a)(ii) is stearic hydroxyethyl imidazoline wherein $R_1$ is an aliphatic $C_{17}$ hydrocarbon group, $R_2$ is a divalent ethylene group; this chemical is sold under the trade names of Alkazine® ST by Alkaril Chemicals, Inc., or Schercozoline® S by Scher Chemicals, Inc.

An example of Component I(a)(iv) is N,N"-ditallowalkoyldiethylenetriamine where $R_1$ is an aliphatic $C_{15}$–$C_{17}$ hydrocarbon group and $R_2$ and $R_3$ are divalent ethylene groups.

An example of Component I(a)(v) is 1-tallowamidoethyl-2-tallowimidazoline wherein $R_1$ is an aliphatic $C_{15}$–$C_{17}$ hydrocarbon group and $R_2$ is a divalent ethylene group.

The Components I(a)(iii) and I(a)(v) can also be first dispersed in a Bronsted acid dispersing aid having a pKa value of not greater than about 4; provided that the pH of the final composition is not greater than about 5. Some preferred dispersing aids are hydrochloric acid, phosphoric acid, or methylsulfonic acid.

Both N,N"-ditallowalkoyldiethylenetriamine and 1-tallow(amidoethyl)-2-tallowimidazoline are reaction products of tallow fatty acids and diethylenetriamine, and are precursors of the cationic fabric softening agent methyl-1-tallowamidoethyl-2-tallowimidazolinium methylsulfate (see "Cationic Surface Active Agents as Fabric Softeners," R. R. Egan, Journal of the American Oil Chemicals' Society, January 1978, pages 118–121). N,N"-ditallowalkoyldiethylenetriamine and 1-tallowamidoethyl-2-tallowimidazoline can be obtained from Sherex Chemical Company as experimental chemicals. Methyl-1-tallowamidoethyl-2-tallowimidazolinium methylsulfate is sold by Sherex Chemical Company under the trade name Varisoft™ 475.

Component I(b)

The preferred Component I(b) is a cationic nitrogenous salt containing one long chain acyclic aliphatic $C_{15}$–$C_{22}$ hydrocarbon group selected from the group consisting of:

(i) acyclic quaternary ammonium salts having the formula:

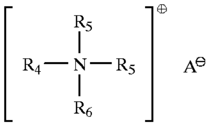

wherein $R_4$ is an acyclic aliphatic $C_{15}$–$C_{22}$ hydrocarbon group, $R_5$ and $R_6$ are $C_1$–$C_4$ saturated alkyl or hydroxyalkyl groups, and $A^{\ominus}$ is an anion;

(ii) substituted imidazolinium salts having the formula:

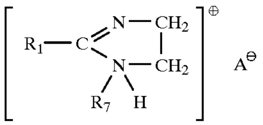

wherein $R_1$ is an acyclic aliphatic $C_{15}$–$C_{21}$ hydrocarbon group, $R_7$ is a hydrogen or a $C_1$–$C_4$ saturated alkyl or hydroxyalkyl group, and $A^{\ominus}$ is an anion;

(iii) substituted imidazolinium salts having the formula:

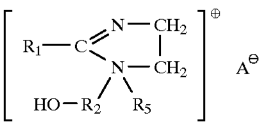

wherein $R_2$ is a divalent $C_1$–$C_3$ alkylene group and $R_1$, $R_5$ and $A^{\ominus}$ are as defined above;

(iv) alkylpyridinium salts having the formula:

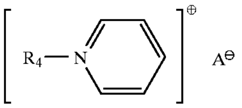

wherein $R_4$ is an acyclic aliphatic $C_{16}$–$C_{22}$ hydrocarbon group and $A^{\ominus}$ is an anion; and (v) alkanamide alkylene pyridinium salts having the formula:

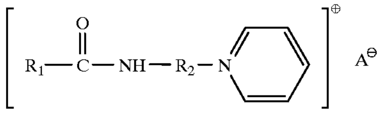

wherein $R_1$ is an acyclic aliphatic $C_{15}$–$C_{21}$ hydrocarbon group, $R_2$ is a divalent $C_1$–$C_3$ alkylene group, and $A^{\ominus}$ is an ion group;

(vi) monoester quaternary ammonium compounds having the formula:

$$[(R)_3—N^{\oplus}—(CH_2)_n—Y—R^2]\ A^{\ominus}$$

wherein each Y=—O—(O)C—, or —C(O)—O—;

each n=1 to 4;

each R substituent is a short chain $C_1$–$C_6$, preferably $C_1$–$C_3$ alkyl or hydroxyalkyl group, e.g., methyl (most preferred), ethyl, propyl, hydroxyethyl, and the like, benzyl or mixtures thereof;

$R^2$ is a long chain $C_{10}$–$C_{22}$ hydrocarbyl, or substituted hydrocarbyl substituent, preferably $C_{15}$–$C_{19}$ alkyl and/or alkenyl, most preferably $C_{15}$–$C_{18}$ straight chain alkyl and/or alkenyl; and the counterion, $A^{\ominus}$, can be any softener-compatible anion, for example, chloride, bromide, methylsulfate, formate, sulfate, nitrate and the like; and (vii) mixtures thereof.

Examples of Component I(b)(i) are the monoalkyltrimethylammonium salts such as monotallowtrimethylammonium chloride, mono(hydrogenated tallow) trimethylammonium chloride, palmityltrimethylammonium chloride and soyatrimethylammonium chloride, sold by Sherex Chemical Company under the trade name Adogen® 471, Adogen® 441, Adogen® 444, and Adogen® 415, respectively. In these salts, $R_4$ is an acyclic aliphatic $C_{16}$–$C_{18}$ hydrocarbon group, and $R_5$ and $R_6$ are methyl groups. Mono(hydrogenated tallow)trimethylammonium chloride and monotallowtrimethylammonium chloride are preferred. Other examples of Component I(b)(i) are behenyltrimethylammonium chloride wherein $R_4$ is a $C_{22}$ hydrocarbon group and sold under the trade name Kemamine® Q2803-C by Humko Chemical Division of Witco Chemical Corporation; soyadimethylethylammonium ethylsulfate wherein $R_4$ is a $C_{16}$–$C_{18}$ hydrocarbon group, $R_5$ is a methyl group, $R_6$ is an ethyl group, and $A^{\ominus}$ is an ethylsulfate anion, sold under the trade name Jordaquat® 1033 by Jordan Chemical Company; and methyl-bis(2-hydroxyethyl) octadecylammonium chloride wherein $R_4$ is a $C_{18}$ hydrocarbon group, $R_5$ is a 2-hydroxyethyl group and $R_6$ is a methyl group and available under the trade name Ethoquad® 18/12 from Armak Company.

An example of Component I(b)(iii) is 1-ethyl-1-(2-hydroxyethyl)-2-isoheptadecylimidazolinium ethylsulfate wherein $R_1$ is a $C_{17}$ hydrocarbon group, $R_2$ is an ethylene group, $R_5$ is an ethyl group, and $A^{\ominus}$ is an ethylsulfate anion. It is available from Mona Industries, Inc., under the trade name Monaquat® ISIES.

An example of Component I(b)(vi) is mono (tallowoyloxyethyl)-hydroxyethyldimethylammonium chloride, i.e., monoester of tallow fatty acid with di(hydroxyethyl)dimethylammonium chloride, a by-product in the process of making diester of tallow fatty acid with di(hydroxyethyl)dimethylammonium chloride, i.e., di(tallowoyloxyethyl)dimethylammonium chloride, a I(c) (vii) component (vide infra).

Component I(c)

Preferred cationic nitrogenous salts having two or more long chain acyclic aliphatic $C_{15}$–$C_{22}$ hydrocarbon groups or one said group and an arylalkyl group which can be used either alone or as part of a mixture are selected from the group consisting of:

(i) acyclic quaternary ammonium salts having the formula:

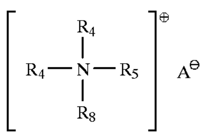

wherein $R_4$ is an acyclic aliphatic $C_{15}$–$C_{22}$ hydrocarbon group, $R_5$ is a $C_1$–$C_4$ saturated alkyl or hydroxyalkyl group, $R_8$ is selected from the group consisting of $R_4$ and $R_5$ groups, and $A^{\ominus}$ is an anion defined as above;

(ii) diamido quaternary ammonium salts having the formula:

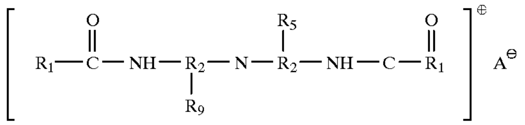

wherein $R_1$ is an acyclic aliphatic $C_{15}$–$C_{21}$ hydrocarbon group, $R_2$ is a divalent alkylene group having 1 to 3 carbon atoms, $R_5$ and $R_9$ are $C_1$–$C_4$ saturated alkyl or hydroxyalkyl groups, and $A^{\ominus}$ is an anion;

(iii) diamino alkoxylated quaternary ammonium salts having the formula:

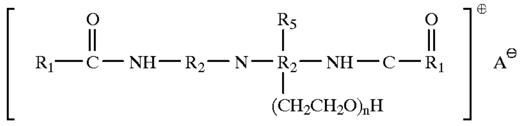

wherein n is equal to 1 to about 5, and $R_1$, $R_2$, $R_5$ and $A^{\ominus}$ are as defined above;

(iv) quaternary ammonium compounds having the formula:

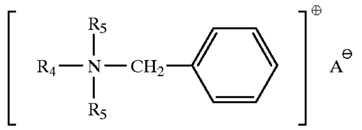

wherein $R_4$ is an acyclic aliphatic $C_{15}$–$C_{22}$ hydrocarbon group, $R_5$ is a $C_1$–$C_4$ saturated alkyl or hydroxyalkyl group, $A^{\ominus}$ is an anion;

(v) substituted imidazolinium salts having the formula:

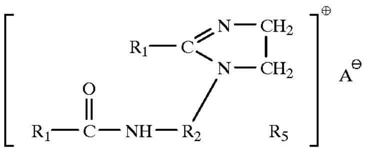

wherein $R_1$ is an acyclic aliphatic $C_{15}$–$C_{21}$ hydrocarbon group, $R_2$ is a divalent alkylene group having 1 to 3 carbon atoms, and $R_5$ and $A^{\ominus}$ are as defined above; and (vi) substituted imidazolinium salts having the formula:

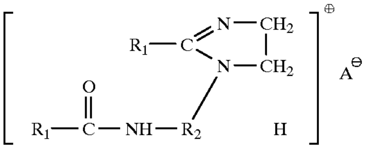

wherein $R_1$, $R_2$ and $A^{\ominus}$ are as defined above;

(vii) diester quaternary ammonium (DEQA) compounds having the formula:

$$(R)_{4-m}—N^{\oplus}—[(CH_2)_n—Y—R^2]_m\ A^{\ominus}$$

wherein each Y=—O—(O)C—, or —C(O)—O—;

m=2 or 3;

each n=1 to 4;

each R substituent is a short chain $C_1$–$C_6$, preferably $C_1$–$C_3$ alkyl or hydroxyalkyl group, e.g., methyl (most preferred), ethyl, propyl, hydroxyethyl, and the like, benzyl, or mixtures thereof;

each $R^2$ is a long chain $C_{10}$–$C_{22}$ hydrocarbyl, or substituted hydrocarbyl substituent, preferably $C_{15}$–$C_{19}$ alkyl and/or alkenyl, most preferably $C_{15}$–$C_{18}$ straight chain alkyl and/or alkenyl; and the counterion, $A^{\ominus}$, can be any softener-compatible anion, for example, chloride, bromide, methylsulfate, formate, sulfate, nitrate and the like; and (viii) mixtures thereof.

Examples of Component I(c)(i) are the well-known dialkyldimethylammonium salts such as ditallowdimethylammonium chloride, ditallowdimethylammonium methylsulfate, di(hydrogenated tallow)dimethylammonium chloride, distearyldimethylammonium chloride, dibehenyldimethylammonium chloride. Di(hydrogenated tallow) dimethylammonium chloride and ditallowdimethylammonium chloride are preferred. Examples of commercially available dialkyldimethylammonium salts usable in the present invention are di(hydrogenated tallow) dimethylammonium chloride (trade name Adogen® 442), ditallowdimethylammonium chloride (trade name Adogen® 470), distearyldimethylammonium chloride (trade name Arosurf® TA-100), all available from Sherex Chemical Company. Dibehenyldimethylammonium chloride wherein $R_4$ is an acyclic aliphatic $C_{22}$ hydrocarbon group is sold under the trade name Kemamine Q-2802C by Humko Chemical Division of Witco Chemical Corporation.

Examples of Component I(c)(ii) are methylbis (tallowamidoethyl)(2-hydroxyethyl)ammonium methylsulfate and methylbis(hydrogenated tallowamidoethyl)(2-hydroxyethyl)ammonium methylsulfate wherein $R_1$ is an acyclic aliphatic $C_{15}$–$C_{17}$ hydrocarbon group, $R_2$ is an ethylene group, $R_5$ is a methyl group, $R_9$ is a hydroxyalkyl group and $A^{\ominus}$ is a methylsulfate anion; these materials are available from Sherex Chemical Company under the trade names Varisoft® 222 and Varisoft® 110, respectively.

An example of Component I(c)(iv) is dimethylstearylbenzylammonium chloride wherein $R_4$ is an acyclic aliphatic $C_{18}$ hydrocarbon group, $R_5$ is a methyl group and $A^{\ominus}$ is a chloride anion, and is sold under the trade names Varisoft® SDC by Sherex Chemical Company and Ammonyx® 490 by Onyx Chemical Company.

Examples of Component I(c)(v) are 1-methyl-1-tallowamidoethyl-2-tallowimidazolinium methylsulfate and 1-methyl-1-(hydrogenated tallowamidoethyl)-2-(hydrogenated tallow)imidazolinium methylsulfate wherein $R_1$ is an acyclic aliphatic $C_{15}$–$C_{17}$ hydrocarbon group, $R_2$ is an ethylene group, $R_5$ is a methyl group and $A^{\ominus}$ is a chloride anion; they are sold under the trade names Varisoft® 475 and Varisoft® 445, respectively, by Sherex Chemical Company.

It will be understood that for I(c)(vii) above substituents R and $R^2$ can optionally be substituted with various groups such as alkoxyl or hydroxyl groups, and/or can be saturated, unsaturated, straight, and/or branched so long as the $R^2$ groups maintain their basically hydrophobic character. Preferred softening compounds are biodegradable such as those in Component I(c)(vii). These preferred compounds can be considered to be diester variations of ditallow dimethyl ammonium chloride (DTDMAC), which is a widely used fabric softener.

The following are non-limiting examples of I(c)(vii) (wherein all long-chain alkyl substituents are straight-chain):

$[CH_3]_2{}^{\oplus}N[CH_2CH_2OC(O)R^2]\ C1^{\ominus}$ $[HO—CH(CH_3)CH_2][CH_3]^{\oplus}N[CH_2CH_2OC(O)C_{15}H_{31}]_2\ Br^{\ominus}$ $[C_2H_5]_2{}^{\oplus}N[CH_2CH_2OC(O)C_{17}H_{35}]_2\ C1^{\ominus}$ $[CH_3][C_2H_5]^{\oplus}N[CH_2CH_2OC(O)C_{13}H_{27}]_2\ I^{63}$ $[C_3H_7][C_2H_5]^{\oplus}N[CH_2CH_2OC(O)C_{15}H_{31}]_2\ SO_4{}^{63}\ CH_3$

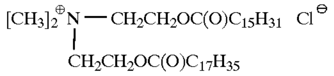

$[CH_2CH_2OH][CH_3]^{\oplus}N[CH_2CH_2OC(O)R^2]_2\ C1^{63}$ where —C(O)$R^2$ is derived from soft tallow and/or hardened tallow fatty acids. Especially preferred is diester of soft and/or hardened tallow fatty acids with di(hydroxyethyl) dimethylammonium chloride, also called di(tallowoyloxyethyl)dimethylammonium chloride.

Since the foregoing compounds (diesters) are somewhat labile to hydrolysis, they should be handled rather carefully when used to formulate the compositions herein. For example, stable liquid compositions herein are formulated at a pH in the range of about 2 to about 5, preferably from about 2 to about 4.5, more preferably from about 2 to about 4. The pH can be adjusted by the addition of a Bronsted acid. pH ranges for making stable softener compositions containing diester quaternary ammonium fabric softening compounds are disclosed in U.S. Pat. No. 4,767,547, Straathof and Konig, issued Aug. 30, 1988, and is incorporated herein by reference.

The diester quaternary ammonium fabric softening compound (DEQA) of I(c)(vii) can also have the general formula:

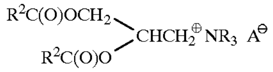

wherein each R, $R^2$, and $A^{\ominus}$ have the same meanings as before. Such compounds include those having the formula:

$[CH_3]_3{}^{\oplus}N[CH_2CH(CH_2OC[O]R^2)OC(O)R^2]\ C1^{\ominus}$ where .OC(O)$R^2$ is derived from soft tallow and/or hardened tallow fatty acids.

Preferably each R is a methyl or ethyl group and preferably each $R^2$ is in the range of $C_{15}$ to $C_{19}$. Degrees of branching, substitution and/or non-saturation can be present in the alkyl chains. The anion $A^{\ominus}$ in the molecule is preferably the anion of a strong acid and can be, for example, chloride, bromide, iodide, sulphate, and methyl sulphate; the anion can carry a double charge in which case $A^{\ominus}$ represents half a group. These compounds, in general, are more difficult to formulate as stable concentrated liquid compositions.

These types of compounds and general methods of making them are disclosed in U.S. Pat. No. 4,137,180, Naik et al., issued Jan. 30, 1979, which is incorporated herein by reference.

A preferred composition contains Component I(a) at a level of from about 10% to about 80%, Component I(b) at a level of from about 3% to about 40%, and Component I(c) at a level of from about 10% to about 80%, by weight of said Component I. A more preferred composition contains Component I(c) which is selected from the group consisting of: (i) di(hydrogenated tallow)dimethylammonium chloride; (v) methyl-1-tallowamidoethyl-2-tallowimidazolinium methylsulfate; (vii) diethanol ester dimethylammonium chloride; and mixtures thereof.

An even more preferred composition contains Component I(a): the reaction product of about 2 moles of hydrogenated tallow fatty acids with about 1 mole of N-2-hydroxyethylethylenediamine and is present at a level of from about 20% to about 70% by weight of Component I; Component I(b): mono(hydrogenated tallow) trimethylammonium chloride present at a level of from about 3% to about 30% by weight of Component I; Component I(c): selected from the group consisting of di(hydrogenated tallow)dimethylammonium chloride, ditallowdimethylammonium chloride, methyl-1-tallowamidoethyl-2-tallowimidazolinium methyl sulfate, diethanol ester dimethylammonium chloride, and mixtures thereof; wherein Component I(c) is present at a level of from about 20% to about 60% by weight of Component I; and wherein the weight ratio of said di(hydrogenated tallow) dimethylammonium chloride to said methyl-1-tallowamidoethyl-2-tallowimidazolinium methylsulfate is from about 2:1 to about 6:1.

The above individual components can also be used individually, especially those of I(c) (e.g., ditallowdimethylammonium chloride or diethanol ester dimethylammonium chloride).

Anion $A^{\ominus}$

In the cationic nitrogenous salts herein, the anion $A^{\ominus}$ provides charge neutrality. Most often, the anion used to provide charge neutrality in these salts is a halide, such as fluoride, chloride, bromide, or iodide. However, other anions can be used, such as methylsulfate, ethylsulfate, hydroxide, acetate, formate, sulfate, carbonate, and the like. Chloride and methylsulfate are preferred herein as anion $A^{\ominus}$.

II. Polymeric Dye Transfer Inhibiting Agents

The composition of the present invention contains an effective amount of polymeric dye transfer inhibiting agent (dye transfer inhibitor or DTI) or mixtures thereof. An effective amount is typically an amount of DTI which will provide at least about 0.1 ppm, preferably from about 0.1 ppm to about 2,000 ppm, more preferably from about 0.2 ppm to about 1,000 ppm, in the wash or rinse solution. Preferably, the present invention contains from about 0.03% to about 25% of dye transfer inhibitor, more preferably from about 0.1% to about 15%, and even more preferably from about 0.2% to about 10% for concentrated liquid softener compositions, and from about 0.01% to about 8% for compositions with softener active of less than about 9%.

Dye transfer inhibitors useful in the present invention include water-soluble polymers containing nitrogen and oxygen atoms, selected from the group consisting of:

(A) polymers, which are not enzymes, with one or more monomeric units containing at least one =N—C(=O)— group;

(B) polymers with one or more monomeric units containing at least one N-oxide group;

(C) polymers containing both =N—C(=O)— and N-oxide groups of (A) and (B);

(D) mixtures thereof;

wherein the nitrogen of the =N—C(=O)— group can be bonded to either one or two other atoms (i.e., can have two single bonds or one double bond).

Dye transfer inhibitors useful in the present invention include water-soluble polymers having the structure:

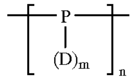

wherein each P is selected from homopolymerizable and copolymerizable moieties which attach to form the polymer backbone, preferably each P being selected from the group consisting of: vinyl moieties, e.g., $[—C(R)_2—C(R)_2—]$; other monomeric moieties, e.g., $[[C(R)_2]_x—L—]$, wherein each x is an integer from 1 to 6 and each L is independently selected from the group consisting of:

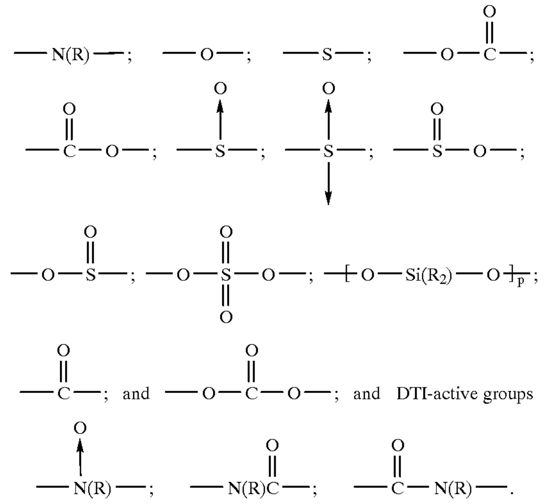

and DTI-active groups wherein each R is H, $C_{1-12}$ (preferably $C_{1-4}$) alkyl(ene), $C_6$–$C_{12}$ aryl(ene) and/or D, m is from 0 to 2, and p is from 1 to about 6; wherein each D contains moieties selected from the group consisting of: L moieties; structural moieties selected from the group consisting of linear and cyclic $C_{1-12}$ (preferably $C_{1-4}$) alkyl; $C_{1-2}$ alkylene; $C_{1-12}$ heterocyclic groups, which can also contain the DTI active groups; aromatic $C_{6-12}$ groups; and Rs to complete the group, wherein any linking groups which are attached to each other form linkages that are substantially stable under conditions of use; and wherein the nitrogen atoms can be attached to one, two, or three other atoms, the

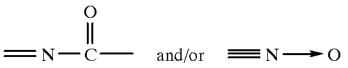

groups present being sufficient to provide dye transfer inhibition, the total molecular weight being from about 500 to about 1,000,000, preferably from about 1,000 to about 500,000, n being selected to provide the indicated molecular weight, and the water solubility being at least about 100 ppm, preferably at least about 300 ppm, and more preferably at least about 1,000 ppm in water at ambient temperature of about 25° C.

A. Polymers with Active =N—C(=O)— Groups

One useful group of polymeric DTIs include water-soluble polymers containing active =N—C(=O)— groups, excluding enzymes. The nitrogen of the =N—C(=O)— group can be bonded to either one or two other atoms.

Examples of polymers containing =N—C(=O)— groups are:

Polyvinylpyrrolidone:

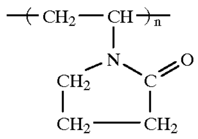

Polyvinyloxazolidone:

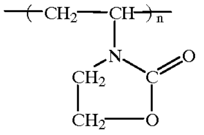

Polyvinylmethyloxazolidone:

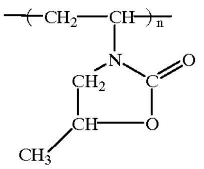

Polyacrylamide and N-substituted polyacrylamides:

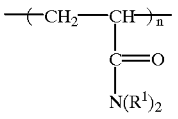

wherein each $R_1$ is independently selected from H and $C_1$–$C_6$ alkyl groups, e.g., methyl, ethyl, propyl, or isopropyl, or two $R_1$ groups can form a 5 or 6 member ring structure.

Polymethacrylamide and N-substituted polymethacrylamides:

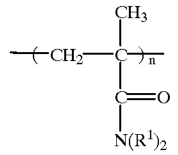

wherein each $R_1$ is as described above.

Poly(N-acrylylglycinamide):

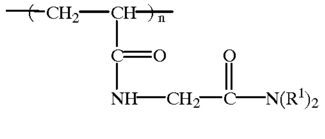

Poly(N-methacrylylglycinamide):

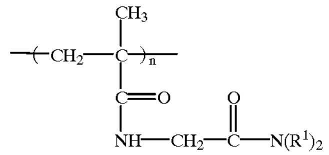

Poly(2-ethyl-2-oxazoline):

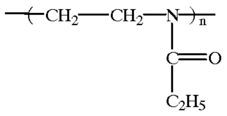

Polyvinylurethane:

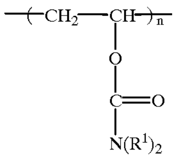

wherein each $R_1$ is as described above. Mixtures of these groups can be present in the polymeric DTI groups of (A) and (C) described hereinbefore and hereinafter.

These polymers have an amphiphilic character with polar groups conferring hydrophilic properties and apolar groups conferring hydrophobic properties. Preferred polymers are those having the nitrogen atoms highly substituted so that they are shielded to different degrees by the surrounding apolar groups. Examples of said polymers are polyvinylpyrrolidones, polyvinyloxazolidones, N,N-disubstituted polyacrylamides, and N,N-disubstituted polymethacrylamides. Detailed description of physicochemical properties of some of these polymers are given in "Water-Soluble Synthetic Polymers: Properties and Behavior," Vol. I, Philip Molyneux, CRC Press, 1983.

These polymers are also useful in the present invention in partially hydrolyzed and/or crosslinked forms.

A preferred dye transfer inhibitor is polyvinylpyrrolidone (PVP). This polymer has an amphiphilic character with a highly polar amide group conferring hydrophilic and polar-attracting properties, and also has apolar methylene and methine groups, in the backbone and/or the ring, conferring hydrophobic properties. The rings may also provide planar alignment with the aromatic rings in the dye molecules. PVP is readily soluble in aqueous and organic solvent systems.

PVP is available from ISP, Wayne, N.J., and BASF Corp., Parsippany, N.J., as a powder or aqueous solutions in several viscosity grades, designated as, e.g., K-12, K-15, K-25, and K-30. These K-values indicate the viscosity average molecular weight, as shown below:

| | K-12 | K-15 | K-25 | K-30 |
|---|---|---|---|---|
| PVP Viscosity Avg. Mol. Wt. | 2,500 | 10,000 | 24,000 | 40,000 |

PVP K-12, K-15, and K-30 are also available from Polysciences, Inc. Warrington, Pa., and PVP K-15, K-25, and K-30 and poly(2-ethyl-2-oxazoline) are available from Aldrich Chemical Co., Inc., Milwaukee, Wis.

The average molecular weight for water-soluble polymers with =N—C(=O)— groups useful in the present invention is from about 500 to about 100,000, preferably from about 500 to about 40,000, and more preferably from about 1,000 to about 30,000.

B. Polymers with Active N-Oxide Groups

Another useful group of polymeric DTI include water-soluble polymers containing active ≡N→O groups. The nitrogen of the ≡N→O group can be bonded to either one, two, or three other atoms.

One or more of the ≡N→O groups can be part of the pendant D group or one or more ≡N→O groups can be part of the polymerizable P unit or a combination of both.

Where the ≡N→O group is part of the pendant D group, preferred D groups contain cyclic structures with the nitrogen atom of the ≡N→O group being part of the ring or outside the ring. The ring in the D group may be saturated, unsaturated, or aromatic.

Examples of D groups containing the nitrogen atom of the ≡N→O group include N-oxides of heterocyclic compounds such as the N-oxides of pyridine, pyrrole, imidazole, pyrazole, pyrazine, pyrimidine, pyridazine, piperidine, pyrrolidone, azolidine, morpholine, and derivatives thereof. A preferred dye transfer inhibitor is poly(4-vinylpyrldine N-oxide) (PVNO). Examples of D groups with the nitrogen atom of the N→O group being outside the ring include aniline oxide and N-substituted aniline oxides.

An example of a polymer wherein the ≡N→O group is part of the monomeric P backbone group is polyethylene-imine N-oxide.

Mixtures of these groups can be present in the polymeric DTIs of (B) and (C).

The amine N-oxide polymers of the present invention typically have a ratio of amine N-oxide to the amine of from about 1:0 to about 1:2. The amount of amine oxide groups present in the polyamine oxide polymer can be varied by appropriate copolymerizatlon or by appropriate degree of N-oxidation. Preferably, the ratio of amine N-oxide to amine is from about 1:0 to about 1:1, most preferred from 1:0 to about 3:1.

The amine oxide unit of the polyamine N-oxides has a PKa≦10, preferably PKa≦7, more preferably PKa≦6.

The average molecular weight of (B) useful in the present invention is from about 500 to about 1,000,000; more preferably from about 1,000 to about 500,000; most preferably from about 2,000 to about 100,000.

Any polymer backbone above can be used in (A) or (B) as long as the polymer formed is water soluble and has dye transfer inhibiting properties. Examples of suitable polymeric backbones are polyvinyls, polyalkylenes, polyesters, polyethers, polyamide, polyimides, polyacrylates, and copolymers and block copolymers thereof, and mixtures thereof.

C. Copolymers Including Active =N—C(=O)— and/or ≡N→O Group

Effective polymeric DTI agents can include those formed by copolymerizing mixtures of monomeric, oligomeric, and/or polymeric units containing active =N—C(=O)— and/or active ≡N→O groups (e.g., copolymers and/or block copolymers of PVP and PVNO). Other suitable DTI copolymers include those in which an effective amount of monomeric, oligomeric, and/or polymeric units containing active =N—C(=O)— groups and/or active ≡N→O groups is copolymerized with "filler" monomeric, oligomeric, and/or polymeric units which do not contain active =N—C(=O)— or ≡N→O groups but which impart other desirable properties to the DTI copolymer, such as increased water solubility or enhanced fabric substantivity [e.g., block copolymer of PVP (≧ about 60%) and polyvinylimidazole].

III. Liquid Carriers

The liquid carrier is typically selected from the group consisting of water, $C_1$–$C_4$ monohydric alcohols, $C_2$–$C_6$ polyhydric alcohols (e.g., alkylene glycols like propylene glycol), liquid polyalkylene glycols such as polyethylene glycol with an average molecular weight of about 200, and mixtures thereof. Water, a preferred carrier, may be distilled, deionized, or tap water.

IV. Optional Ingredients

A. Polymeric Soil Release Agents

Soil release agents, usually polymers, are especially desirable additives at levels of from about 0.05% to about 5%, preferably from about 0.1% to about 4%, more preferably from about 0.2% to about 3%. Suitable soil release agents are disclosed in U.S. Pat. No. 4,702,857, Gosselink, issued Oct. 27, 1987; U.S. Pat. No. 4,711,730, Gosselink and Diehl, issued Dec. 8, 1987; U.S. Pat. No. 4,713,194, Gosselink issued Dec. 15, 1987; U.S. Pat. No. 4,877,896, Maldonado, Trinh, and Gosselink, issued Oct. 31, 1989; U.S. Pat. No. 4,956,447, Gosselink, Hardy, and Trinh, issued Sep. 11, 1990; and U.S. Pat. No. 4,749,596, Evans, Huntington, Stewart, Wolf, and Zimmerer, issued Jun. 7, 1988, said patents being incorporated herein by reference.

Especially desirable optional ingredients are polymeric soil release agents comprising block copolymers of polyalkylene terephthalate and polyoxyethylene terephthalate, and block copolymers of polyalkylene terephthalate and polyethylene glycol. The polyalkylene terephthalate blocks preferably comprise ethylene and/or propylene groups. Many such soil release polymers are nonionic.

A preferred nonionic soil release polymer has the following average structure:

SRP I: $CH_3O(CH_2CH_2O)_{40}$

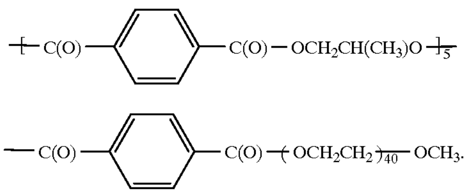

Such soil release polymers are described in U.S. Pat. No. 4,849,257, Borcher, Trinh and Bolich, issued Jul. 18, 1989, said patent being incorporated herein by reference.

Another highly preferred nonionic soil release polymer is described in copending U.S. patent application Ser. No. 07/676,682, Pan, Gosselink, and Honsa, filed Mar. 28, 1991, said application being incorporated herein by reference.

The polymeric soil release agents useful in the present invention can include anionic and cationic polymeric soil release agents. Suitable anionic polymeric or oligomeric soil release agents are disclosed in U.S. Pat. No. 4,018,569, Trinh, Gosselink and Rattinger, issued Apr. 4, 1989, said patent being incorporated herein by reference. Other suitable polymers are disclosed in U.S. Pat. No. 4,808,086, Evans, Huntington, Stewart, Wolf, and Zimmerer, issued Feb. 24, 1989, said patent being incorporated herein by reference. Suitable cationic soil release polymers are described in U.S. Pat. No. 4,956,447, Gosselink, Hardy, and Trinh, issued Sep. 11, 1990, said patent being incorporated hereinbefore by reference.

B. Other Optional Ingredients

A preferred optional ingredient is perfume. Such perfume is preferably present at a level of from about 0.01% to about 5%, preferably from about 0.05% to about 3%, more preferably from about 0.1% to about 2%, by weight of the total composition.

Other adjuvants can be added to the compositions herein for their known purposes. Such adjuvants include, but are not limited to, viscosity control agents, emulsifiers, preservatives, antioxidants, bacteriocides, fungicides, brighteners, opacifiers, freeze-thaw control agents, shrinkage control agents, and agents to provide ease of ironing. These adjuvants, if used, are added at their usual levels, generally each at up to about 5% by weight of the composition.

Viscosity control agents can be organic or inorganic in nature. Examples of organic viscosity modifiers (lowering) are aryl carboxylates and sulfonates (e.g., benzoate, 2-hydroxybenzoate, 2-aminobenzoate, benzenesulfonate, 2-hydroxybenzenesulfonate, 2-aminobenzenesulfonate, etc.), fatty acids and esters, fatty alcohols, and water-miscible solvents such as short chain alcohols. Examples of inorganic viscosity control agents are water-soluble ionizable salts. A wide variety of ionizable salts can be used. Examples of suitable salts are the halides of the group IA and IIA metals of the Periodic Table of the Elements, e.g., calcium chloride, magnesium chloride, sodium chloride, potassium bromide, and lithium chloride. Calcium chloride is preferred. The ionizable salts are particularly useful during the process of mixing the ingredients to make the compositions herein, and later to obtain the desired viscosity. The amount of ionizable salts used depends on the amount of active ingredients used in the compositions and can be adjusted according to the desire of the formulator. Typical levels of salts used to control the composition viscosity are from 0 to about 10,000 parts per million (ppm), preferably from about 10 to about 6,000 ppm by weight of the composition.

Viscosity modifiers (raising) can be added to increase the ability of the compositions to stably suspend water-insoluble particles, e.g., perfume microcapsules. Such materials include hydroxypropyl substituted guar gum (e.g., Jaguar® HP200, available from Rhône-Poulenc), polyethylene glycol (e.g., Carbowax 20M from Union Carbide), hydrophobic modified hydroxyethylcellulose (e.g., Natrosol Plus® F.rom Aqualon), and/or organophilic clays (e.g., Hectorite and/or Bentonite clays such as Bentones® 27, 34 and 38 from Rheox Co.). These viscosity raisers (thickeners) are typically used at levels from about 500 ppm to about 30,000 ppm, preferably from about 1,000 ppm to about 5,000 ppm, more preferably from about 1,500 ppm to about 3,500 ppm.

Examples of bacteriocides useful in the compositions of this invention are glutaraldehyde, formaldehyde, 2-bromo-2-nitropropane-1,3-diol sold by Inolex Chemicals under the trade name Bronopol®, and a mixture of 5-chloro-2-methyl-4-isothiazoline-3-one and 2-methyl-4-isothiazoline-3-one sold by Rohm and Haas Company under the trade name Kathon® C.G/ICP. Typical levels of bacteriocides used in the present compositions are from about 1 to about 1,000 ppm by weight of the composition.

Examples of antioxidants that can be added to the compositions of this invention are propyl gallate, available from Eastman Chemical Products, Inc., under the trade names Tenox® PG and Tenox S-1, and dibutylated hydroxy toluene, available from UOP Process Division under the trade name Sustane® BHT.

The present compositions can contain silicones to provide additional benefits such as ease of ironing and improved fabric absorbency. The preferred silicones are polydimethylsiloxanes of viscosity of from about 100 centistokes (cs) to about 100,000 cs, preferably from about 200 cs to about 60,000 cs and/or silicone gums. These silicones can be used in emulsified form, which can be conveniently obtained directly from the suppliers. Examples of these preemulsified silicones are 60% emulsion of polydimethylsiloxane (350 cs) sold by Dow Corning Corporation under the trade name DOW CORNING® 1157 Fluid and 50% emulsion of polydimethylsiloxane (10,000 cs) sold by General Electric Company under the trade name General Electric® SM 2140 Silicones. Microemulsions are preferred, especially when the composition contains a dye. The optional silicone component can be used in an amount of from about 0.1% to about 6% by weight of the composition.

Silicone foam suppressants can also be used. These are usually not emulsified and typically have viscosities of from about 100 cs to about 10,000 cs, preferably from about 200 cs to about 5,000 cs. Very low levels are used, typically from about 0.01% to about 1%, preferably from about 0.02% to about 0.5%. Another preferred foam suppressant is a silicone/silicate mixture, e.g., Dow Corning's Antifoam A®.

Any dye can be used in the compositions of the present invention, but nonionic dyes are preferred to decrease interaction with dye transfer inhibitor. Useful acid dyes include: Polar Brilliant Blue, and D&C Yellow #10, both supplied by Hilton Davis, Cincinnati, Ohio. Nonionic Liquitint® dyes supplied by Milliken, Spartanburg, S.C., are also useful. Especially preferred Liquitint dyes are selected from the group consisting of: Blue HP, Blue 65, Experimental Yellow 8949-43, Green HMC, Patent Blue, Royal Blue, Teal, Violet, Yellow II, and mixtures thereof.

A preferred composition contains from 0% to about 3% of polydimethylsiloxane, from 0% to about 0.4% of $CaCl_2$, and from about 10 ppm to about 100 ppm of dye.

The pH (10% solution) of the compositions of this invention is generally adjusted to be in the range of from about 2 to about 7, preferably from about 2.4 to about 6.5, more preferably from about 2.6 to about 4. Adjustment of pH is normally carried out by including a small quantity of free acid in the formulation. Because no strong pH buffers are present, only small amounts of acid are required. Any acidic material can be used; its selection can be made by anyone skilled in the softener arts on the basis of cost, availability, safety, etc. Among the acids that can be used are methyl sulfonic, hydrochloric, sulfuric, phosphoric, citric, malelc, and succinic. For the purposes of this invention, pH is measured by a glass electrode in a 10% solution in water of the softening composition in comparison with a standard calomel reference electrode.

V. Process of Making Liquid Compositions

The liquid fabric softening compositions of the present invention can be prepared by the following methods. A convenient and satisfactory method is to prepare a softening active melt premix (active premix) at from about 100° F. (about 38° C.) to about 190° F. (about 88° C.), which is then added with high shear mixing with milling to the hot water seat at from about 100° F. (about 38° C.) to about 190° F. (about 88° C.). The dye transfer inhibitor can be added to the water seat, prior to the beginning of the premix transfer, either as a powder or as an aqueous solution. Temperature-sensitive optional components can be added after the fabric softening composition is cooled to a lower temperature. Preferably the liquid softener compositions of the present invention are made by a process comprising the following steps:

(a) Melting and mixing softener active;

(b) Adding the dye transfer inhibitor to the water seat, the water seat having a temperature from about 100° F. (about 38° C.) to about 190° F. (about 88° C.);

(c) Adding the mixture of (a) into the water seat with agitation;

(d) Optionally adding a viscosity control agent (e.g., $CaCl_2$); and (e) Cooling the composition.

The dye transfer inhibitor can also be added upon cooling of the composition, during or after Step (e), or into the water seat after premix addition is complete, i.e., after Step (c) but before Step (d).

Surprisingly, adding the dye transfer inhibitor into the water seat prior to premix addition results in products having a better dye transfer inhibition than products with dye transfer inhibitor added after premix addition and cooling.

The liquid fabric softening compositions of this invention are used by adding to the rinse cycle of conventional home laundry operations. Generally, rinse water has a temperature of from about 5° C. to about 50° C., more frequently from about 10° C. to about 40° C. The concentration of the fabric softener actives of this invention is generally from about 10 ppm to about 200 ppm, preferably from about 25 ppm to about 100 ppm, by weight of the aqueous rinsing bath. The concentration of the dye transfer inhibitor is generally from about 0.3 ppm to about 500 ppm, more preferably from about 1 ppm to about 300 ppm in the rinse solution.

In general, the present invention in its fabric softening method aspect comprises the steps of (1) washing fabrics in a conventional washing machine or hand washing with a detergent composition; and (2) rinsing the fabrics in a bath which contains the above described amounts of the fabric softeners; (3) drying the fabrics in an automatic laundry dryer or line drying; and (4) subsequent washing of fabrics in a conventional washing machine or hand washing with a detergent composition. When multiple rinses are used, the fabric softening composition is preferably added to the final rinse.

DRYER-ADDED FABRIC SOFTENING COMPOSITIONS

The present invention also relates to dryer-added fabric conditioning (softening) compositions and articles of manufacture in which the fabric conditioning (softening) compositions are affixed to a dispensing means, e.g., a substrate.

In preferred embodiments, the present invention encompasses articles of manufacture, adapted for use to provide unique dye transfer inhibition benefits and to soften fabrics in an automatic laundry dryer, of the types disclosed in U.S. Pat. No. 3,989,631 Marsan, issued Nov. 2, 1976; U.S. Pat. No. 4,055,248, Marsan, issued Oct. 25, 1977; U.S. Pat. No. 4,073,996, Bedenk et al., issued Feb. 14, 1978; U.S. Pat. No. 4,022,938, Zaki et al., issued May 10, 1977; U.S. Pat. No. 4,764,289, Trinh, issued Aug. 16, 1988; U.S. Pat. No. 4,808,086, Evans et al., issued Feb. 28, 1989; U.S. Pat. No. 4,103,047, Zaki et al., issued Jul. 25, 1978; U.S. Pat. No. 3,736,668, Dillarstone, issued Jun. 5, 1973; U.S. Pat. No. 3,701,202, Compa et al., issued Oct. 31, 1972; U.S. Pat. No. 3,634,947, Furgal, issued Jan. 18, 1972; U.S. Pat. No. 3,633,538, Hoeflin, issued Jan. 11, 1972; and U.S. Pat. No. 3,435,537, Rumsey, issued Apr. 1, 1969; and U.S. Pat. No. 4,000,340, Murphy et al., issued Dec. 28, 1976, all of said patents being incorporated herein by reference.

Typical articles of manufacture of this type include articles comprising:

1. a fabric conditioning composition comprising:

I. an effective amount, preferably from about 50% to about 99%, more preferably from about 70% to about 99%, of fabric softening agent;

II. an effective amount, preferably from about 0.2% to about 50%, more preferably from about 1% to about 30%, of polymeric dye transfer inhibiting agent; and III. optionally, a dispensing means which provides for release of an effective amount of said composition to fabrics in an automatic laundry dryer at automatic laundry dryer operating temperatures, e.g., from about 35° C. to 115° C.

When the dispensing means is a flexible substrate, e.g., in sheet configuration, the fabric conditioning composition is releasably affixed on the substrate to provide a weight ratio of conditioning composition to dry substrate ranging from about 10:1 to about 0.5:1, preferably from about 5:1 to about 1:1.

The term "fabric softening agent" as used herein includes cationic and nonionic fabric softeners used alone and also in combination with each other. A preferred fabric softening agent of the present invention is a mixture of cationic and nonionic fabric softeners. An effective amount of dye transfer inhibitor is an amount which will provide from about 0.1 ppm to about 500 ppm of DTI in the wash solution.

I. Fabric Softening Agents

Examples of fabric softening agents that are especially useful in the substrate articles are the compositions described in U.S. Pat. No. 4,103,047, Zaki et al., issued Jul. 25, 1978; U.S. Pat. No. 4,237,155, Kardouche, issued Dec. 2, 1980; U.S. Pat. No. 3,686,025, Morton, issued Aug. 22, 1972; U.S. Pat. No. 3,849,435, Diery et al., issued Nov. 19, 1974; and U.S. Pat. No. 4,073,996, Bedenk et al., issued Feb. 14, 1978; said patents are hereby incorporated herein by reference. Other fabric softening agents are disclosed hereinafter with respect to detergent-compatible fabric conditioning compositions.

Particularly preferred cationic fabric softeners for substrate articles include quaternary ammonium salts such as dialkyl dimethylammonium chlorides, methylsulfates, and ethylsulfates wherein the alkyl groups can be the same or different and contain from about 14 to about 22 carbon atoms. Examples of such preferred materials include ditallowalkyldimethylammonium methylsulfate (DTDMAMS), distearyldimethylammonium methylsulfate, dipalmityldimethylammonium methylsulfate and dibehenyldimethylammonium methylsulfate. Also particularly preferred are the carboxylic acid salts of tertiary alkylamines disclosed in said Kardouche patent. Examples include stearyldimethylammonium stearate, distearylmethylammonium myristate, stearyldimethylammonium palmitate, distearylmethylammonium palmitate, and distearylmethylammonium laurate. These carboxylic salts can be made situ by mixing the corresponding amine and carboxylic acid in the molten fabric conditioning composition.

Other preferred types of fabric softener are described in detail in U.S. Pat. No. 4,661,269, Toan Trinh, Errol H. Wahl, Donald M. Swartley, and Ronald L. Hemingway, issued Apr. 28, 1987, said patent being incorporated hereinbefore by reference.

Examples of nonionic fabric softeners are the sorbitan esters, $C_{12}$–$C_{26}$ fatty alcohols, and fatty amines described herein.

A preferred fabric softening agent for use in substrate articles comprises a mixture of (1) $C_{10}$–$C_{26}$ acyl sorbitan esters and mixtures thereof, (2) quaternary ammonium salt, and (3) tertiary alkylamine. The quaternary ammonium salt is preferably present at a level of from about 5% to about 25%, more preferably from about 7% to about 20% of the fabric conditioning composition. The sorbitan ester is preferably present at a level of from about 10% to about 50%, more preferably from about 20% to about 40%, by weight of the fabric conditioning composition. The tertiary alkylamine is present at a level of from about 5% to about 25%, more preferably from 7% to about 20% by weight of the fabric conditioning composition. The preferred sorbitan ester comprises a member selected from the group consisting of $C_{10}$–$C_{26}$ acyl sorbitan monoesters and $C_{10}$–$C_{26}$ acyl sorbitan di-esters, and ethoxylates of said esters wherein one or more of the unesterified hydroxyl groups in said esters contain from 1 to about 6 oxyethylene units, and mixtures thereof. The quaternary ammonium salt is preferably in the methylsulfate form. The preferred tertiary alkylamine is selected from the group consisting of alkyldimethylamine and dialkylmethylamine and mixtures thereof, wherein the alkyl groups can be the same or different and contain from about 14 to about 22 carbon atoms.

Yet another preferred fabric softening agent comprises a carboxylic acid salt of a tertiary alkylamine, in combination with a fatty alcohol and a quaternary ammonium salt. The carboxylic acid salt of a tertiary amine is used in the fabric conditioning composition preferably at a level of from about 5% to about 50%, and more preferably, from about 15% to about 35%, by weight of the fabric treatment composition. The quaternary ammonium salt is used preferably at a level of from about 5% to about 25%, and more preferably, from about 7% to about 20%, by weight of the fabric treatment composition. The fatty alcohol can be used preferably at a level of from about 10% to about 25%, and more preferably from about 10% to about 20%, by weight of the fabric treatment composition. The preferred quaternary ammonium salt is selected from the group consisting of dialkyl dimethylammonium salt wherein the alkyl groups can be the same or different and contain from about 14 to about 22 carbon atoms and wherein the counteranion is selected from the group consisting of chloride, methylsulfate and ethylsulfate, preferably methylsulfate. The preferred carboxylic acid salt of a tertiary alkylamine is selected from the group consisting of fatty acid salts of alkyldimethylamines wherein the alkyl group contains from about 14 to about 22 carbon atoms, and the fatty acid contains from about 14 to about 22 carbon atoms, and mixtures thereof. The preferred fatty alcohol contains from about 14 to about 22 carbon atoms.

More biodegradable fabric softener compounds can be desirable. Biodegradability can be increased, e.g., by incorporating easily destroyed linkages into hydrophobic groups. Such linkages include ester linkages, amide linkages, and linkages containing unsaturation and/or hydroxy groups. Examples of such fabric softeners can be found in U.S. Pat. No. 3,408,361, Mannheimer, issued Oct. 29, 1968; U.S. Pat. No. 4,709,045, Kubo et al., issued Nov. 24, 1987; U.S. Pat. No. 4,233,451, Pracht et al., issued Nov. 11, 1980; U.S. Pat. No. 4,127,489, Pracht et al., issued Nov. 28, 1979; U.S. Pat. No. 3,689,424, Berg et al., issued Sep. 5, 1972; U.S. Pat. No. 4,128,485, Baumann et al., issued Dec. 5, 1978; U.S. Pat. No. 4,161,604, Elster et al., issued Jul. 17, 1979; U.S. Pat. No. 4,189,593, Wechsler et al., issued Feb. 19, 1980; and U.S. Pat. No. 4,339,391, Hoffman et al., issued Jul. 13, 1982, said patents being incorporated herein by reference.

II. Polymeric Dye Transfer Inhibiting Agents

Dye transfer inhibiting agents useful for dryer-added fabric softening compositions and articles of the present invention are those described earlier for rinse-added fabric softening compositions. Preferred are solid materials having particle size of about 1 mm or smaller, more preferably about 0.5 mm or smaller, most preferably about 0.2 mm or smaller. Commercial solid polyvinylpyrrolidones are normally available with particle size of less than about 1 mm.

When the dye transfer inhibiting agent has a larger particle size, the particle size can be conveniently reduced by grinding techniques followed by an appropriate particle size sorting method, e.g., sieving.

It is desirable, for ease of application, to intimately admix the ingredients of the fabric softening composition before application to a substrate dispensing means.

III. Optional DisDensing Means

In the preferred substrate article embodiment, the fabric conditioning compositions are provided as an article of manufacture in combination with a dispensing means such as a flexible substrate which effectively releases the composition in an automatic laundry (clothes) dryer. Such dispensing means can be designed for single usage or for multiple uses. The dispensing means can also be a "vanishing substrate material" that releases the fabric conditioning composition and then is dispersed and/or exhausted from the dryer.

The dispensing means will normally carry an effective amount of fabric conditioning composition. Such effective amount typically provides sufficient fabric softening agent and dye transfer inhibitor for at least one treatment of a minimum load in an automatic laundry dryer. Amounts of fabric conditioning composition for multiple uses, e.g., up to about 30, can be used. Typical amounts for a single article can vary from about 0.25 g to about 100 g, preferably from about 0.5 g to about 10 g, most preferably from about 1 g to about 5 g.

A highly preferred article herein comprises the fabric conditioning composition releasably affixed to a flexible substrate in a sheet configuration. Highly preferred paper, woven or nonwoven "absorbent" substrates useful herein are fully disclosed in U.S. Pat. No. 3,686,025, Morton, issued Aug. 22, 1972, incorporated herein by reference.

Nonwoven cloth substrates preferably comprise cellulosic fibers having a length of from about 3/16 inch to about 2 inches and a denier of from about 1.5 to about 5 and the substrates are adhesively bonded together with binder resin.

The flexible substrate preferably has openings sufficient in size and number to reduce restriction by said article of the flow of air through an automatic laundry dryer. The better openings comprise a plurality of rectilinear slits extended along one dimension of the substrate.

The substrate embodiment of this invention can be used for imparting the above-described fabric conditioning composition to fabric to provide dye transfer inhibition and/or softening and/or antistatic effects to fabric in an automatic laundry dryer in a process comprising: commingling pieces of damp fabric by tumbling said fabric under heat in an automatic clothes dryer with an effective amount of the fabric conditioning composition, at least the continuous phase of said composition having a melting point greater than about 35° C. and said composition being mobilized, e.g., flowable, at dryer operating temperature, said composition comprising from about 0.2% to about 50%, preferably from about 1% to about 30% of a dye transfer inhibitor powder, and from about 50% to about 99%, preferably from about 70% to about 99%, of fabric softening agent selected from the above-defined cationic and nonionic fabric softeners and mixtures thereof.

The method herein is carried out in the following manner. Damp fabrics, usually containing from about 1 to about 3.5 times their weight of water, are placed in the drum of an automatic laundry (clothes) dryer. In practice, such damp fabrics are commonly obtained by laundering, rinsing, and spin-drying the fabrics in a standard washing machine. In a preferred mode, the present process is carried out by fashioning an article comprising the substrate-like dispensing means of the type hereinabove described in releasable combination with a fabric conditioning composition. This article is simply added to a clothes dryer together with the damp fabrics to be treated. The dryer is then operated in standard fashion to dry the fabrics, usually at a temperature of from about 50° C. to about 80° C. for a period from about 10 minutes to about 60 minutes, depending on the fabric load and type. On removal from the dryer, the dried fabrics have acquired treatment with dye transfer inhibitor and are softened. It is believed that the dye transfer inhibitor deposited on the fabric is resolubilized in the subsequent wash solution to provide a noticeable dye transfer inhibition effect.

IV. Optional Ingredients

A. Viscosity Control Agents

Very useful ingredients are viscosity control agents, especially particulate clays, which are especially useful in the substrate articles. Examples of the particulate clays useful in the present invention are described in U.S. Pat. No. 4,103,047, supra, which is incorporated herein by reference. A preferred clay viscosity control agent is calcium bentonite clay, available from Southern Clay Products under the trade name Bentolite® L. The clay viscosity control agent is preferably present at a level of from about 0.5% to about 15%, more preferably from about 1.5% to about 10% by weight of the fabric conditioning composition.

B. Other Optional Ingredients

Well known optional components included in the fabric conditioning composition which are useful in the present invention are narrated in U.S. Pat. No. 4,103,047, supra, incorporated hereinbefore by reference.

A preferred optional ingredient is perfume/cyclodextrin inclusion complex present in the fabric conditioning composition at from about 0.5% to about 50%, preferably from about 1% to about 45%, more preferably from about 5% to about 40%. See U.S. Pat. No. 5,094,761, Trinh, Gardlik, Banks, and Benvegnu, issued Mar. 10, 1992; and U.S. Pat. No. 5,102,564, Gardlik, Trinh, Banks, and Benvegnu, issued Apr. 7, 1992, which are incorporated herein by reference.

Another preferred optional ingredient is free perfume, other than the perfume which is present as the perfume/cyclodextrin inclusion complex, which is also very useful for imparting odor benefits, especially in the product and/or in the dryer. Preferably, such free perfume contains at least about 1%, more preferably at least about 10% by weight of said free perfume, of substantive perfume materials. Such free perfume is preferably present at a level of from about 0.10% to about 10% by weight of the portion of the composition that is transferred to the fabrics, e.g., everything but the dispensing means in substrate articles.

Other preferred optional ingredients are polymeric soil release agents, described in Section IV.A above of liquid compositions. Preferably, these polymeric soil release agents contain one, or more, negatively charged functional groups such as the sulfonate functional group, preferably as capping groups at the terminal ends of said polymeric soil release agent. The soil release agent is preferably present at a level of from about 1% to about 50%, more preferably from about 5% to about 45%, and most preferably from about 10% to about 40%, by weight of the fabric conditioning composition.

The polymeric soil release agents preferably become molten at temperatures no higher than about 90° C. and have viscosities of less than about 10,000 cps at 85° C. Other polymeric soil release agents with higher viscosities can be used when they are mixed with a viscosity reducing agent. Examples of some viscosity reducing agents for polymeric soil release agents, useful for the present invention, are given in U.S. Pat. No. 4,863,619, issued Sep. 5, 1989; U.S. Pat. No. 4,925,577, issued May 15, 1990; U.S. Pat. No. 5,041,230, issued Aug. 20, 1991, to Borcher, Delgado, and Trinh; these patents are incorporated herein by reference.

The articles of manufacture disclosed hereinbefore can impart noticeable dye transfer inhibition benefits plus softening and/or antistatic effects to fabrics when used in an automatic laundry dryer.

SOLID, PARTICULATE FABRIC SOFTENER COMPOSITIONS

Solid, particulate fabric softening compositions of the present invention typically comprise:

I. an effective amount, preferably from about 20% to about 90%, more preferably from about 30% to about 70%, of fabric softening agent; and II. an effective amount, preferably from about 0.1% to about 80%, more preferably from about 0.3% to about 50%, and even more preferably from about 0.5% to about 25%, of dye transfer inhibiting agent.

An effective amount of DTI is an amount which will provide from about 0.1 ppm to about 500 ppm of DTI in the rinse solution.

Optional, but preferred, ingredients include dispersing agents and perfumes. Preferred dispersing agents are cationic surfactants such as $C_{12}$–$C_{18}$ alkyl trimethylammonium halide, choline ester of fatty acids, etc. Such dispersing agents are present at a level of from 0 to about 45%, preferably from about 1% to about 30%.

Particulate fabric softener compositions for addition in the wash or rinse cycles of an automatic laundering operation have been described in, e.g., U.S. Pat. No. 3,256,180, Weiss, issued Jun. 14, 1966; U.S. Pat. No. 3,351,483, Miner et al., issued Nov. 7, 1967; U.S. Pat. No. 4,308,151, Cambre, issued Dec. 29, 1981; U.S. Pat. No. 4,589,989, Muller et al., issued May 20, 1986; and U.S. Pat. No. 5,009,800, Foster, issued Apr. 23, 1991; and foreign patent applications: Jap.

Laid Open Appln. No. 8799/84, laid open Jan. 18, 1984; Jap. Appln. No. J62253698-A, Nov. 5, 1987; Jap. Laid Open Appln. No. 1-213476, laid open Aug. 28, 1989; Can. Appln. No. CA1232819-A, Feb. 16, 1988; Jap. Appln. No. J63138000-A, Jun. 9, 1988; and European Appln. No. EP-289313-A, Nov. 2, 1988, all of said patents being incorporated herein by reference. A granular fabric softener composition which can be used to prepare a liquid composition is disclosed in allowed U.S. patent application Ser. No. 07/689,406, Hartman, Brown, Rusche, and Taylor, filed Apr. 22, 1991, said application being incorporated herein by reference.

COMPOSITIONAL ADVANTAGES OF THE PRESENT INVENTION

Preferably the softener compositions of the present invention are substantially, preferably, essentially free of aerosol propellants; bleach (especially activated bleach); sachets containing active ingredient; and anionic surfactants. The liquid softener compositions are, in addition, essentially free of large amounts (more than two times the amount of polymeric DTI) of highly ethoxylated and/or propoxylated materials (more than about eight ethoxylated and/or propoxylated units) when the fabric softening agent is methyl-1-oleylamidoethyl-2-oleylimidazollnium methosulfate, or analogous agent. The dryer-added compositions are also essentially free of polymer-coated soil release polymers.

The present invention, especially in the fabric softener aspect, can provide improved DTI benefits after multiple laundry operations. In addition, the invention can improve the appearance of fabrics that have previously been stained by dye transfer. Even after dyes deposit and discolor fabric, the polymeric DTI will help remove this dye from fabrics, especially, e.g., in fabric softener compositions, when used in multiple cycles. Also, the invention can provide a soil anti-redeposition benefit in the wash cycle.

The present invention also relates to a laundry method of minimizing dye transfer during the wash cycle of a laundering process by providing an effective amount of dye transfer inhibitor into the wash solution by means other than by adding it as part of a detergent composition. For example, DTI can be added to the wash solution as a powder, an aqueous solution, via a dispensing means (e.g., substrate) which will prevent powder inhalation, etc.

The invention also encompasses a laundry process (method) for imparting dye transfer inhibition plus softening and/or antistatic effects to fabrics comprising: washing a load of fabrics in a wash solution containing a detergent composition; rinsing said load of fabrics with a composition comprising an effective amount of softening active and an effective amount of dye transfer inhibitor and/or tumbling the load of fabrics under heat in the dryer with a dryer-added softener composition comprising an effective amount of dye transfer inhibitor; and subsequently washing all or part of said load of fabrics, together with or without additional fabrics, during which the dye transfer inhibitor is effectively released into the wash solution containing a detergent composition. A load of fabrics includes one or more fabric articles.

The following are nonlimiting examples of the instant articles and methods. The examples presented hereinbefore and hereinafter do not limit the present invention.

Examples of Liquid Fabric Softening Compositions

The following liquid softener compositions, when added to the rinse cycle of an automatic laundry operation, show dye transfer inhibition in the subsequent wash cycle.

| Components | Examples: 1–3 (Wt. %) | 4 (Wt. %) |
|---|---|---|
| DTDMAC/MTTMAC* Blend (83%) | 4.5 | 4.5 |
| 1-Tallow(amidoethyl)-2-Tallowimidazoline | — | 3.4 |
| HCl | — | 0.2 |
| PVP K-15 | 1.0 | 0.5 |
| Perfume | — | 0.4 |
| Minor Ingredients** | 0.5 | 0.5 |
| Deionized Water | Balance | Balance |
| | 100.00 | 100.00 |

*Ditallowdimethylammonium chloride/monotallowtrimethylammonium chloride.
**Minor ingredients include: Dow Corning polydimethylsiloxane emulsion, calcium chloride, Kathon ® CG/ICP bacteriocide, and Liquitint ® Blue 65 dye.

EXAMPLE 1

The composition of Example 1 is made by the following procedures:

Adding PVP K-15 (average molecular weight of about 10,000, either as a powder or in aqueous solution) with mixing to a vessel containing deionized water, heated to about 65° C. Molten DTDMAC/MTTMAC blend (at about 80° C.) is added with high shear mixing to the aqueous solution. After softener incorporation, the mixture is cooled, and the minor ingredients are added during the cooling process.

EXAMPLE 2

The composition of Example 2 is made similarly to the procedure of Example 1, except that the PVP is added after about 85% of the softener addition is complete. Viscosity is adjusted at this point by adding calcium chloride (0.17%) before PVP addition.

EXAMPLE 3

The composition of Example 3 is made similarly to the procedure of Example 2, except that the PVP is added after all of the softener has been added and the dispersion cooled to room temperature.

| Components | Examples: 5 (Wt. %) | 6 (Wt. %) | 7 (Wt. %) |
|---|---|---|---|
| DTDMAC/MTTMAC* Blend (83%) | 10.48 | 10.48 | 10.48 |
| 1-Tallow(amidoethyl)-2-Tallowimidazoline | 14.3 | 14.3 | 14.3 |
| HCl | 0.85 | 0.85 | 0.85 |
| PVP K-15 | 3.15 | — | — |
| PVP K-25 | — | 3.15 | — |
| PVP K-12 | — | — | 3.15 |
| Soil Release Polymer | — | — | 2.25 |
| Perfume | 1.35 | 1.35 | 1.35 |
| Minor Ingredients** | 1.52 | 1.52 | 1.52 |
| Deionized Water | Balance | Balance | Balance |
| | 100.00 | 100.00 | 100.00 |

*Ditallowdimethylammonium chloride/monotallowtrimethylammonium chloride.
**Minor ingredients as given in Example 1.

EXAMPLES 4–6

The compositions of Examples 4, 5, and 6 are made by adding PVP with mixing to a vessel containing deionized water and HCl, heated to about 65° C. DTDMAC/MTTMAC blend and 1-tallow(amidoethyl)-2-tallowimidazoline are then added as a molten blend (at about 80° C.) with high shear mixing to the aqueous solution. After softener incorporation, the mixture is cooled, and the minor ingredients are added during the cooling process. Perfume is added when the composition is at about 40–50° C. The PVP used in Example 6 has an average molecular weight of about 25,000 (PVP K-25).

EXAMPLE 7

The composition of Example 7 is made similarly to that of Example 4, except that molten soil release polymer is added to the aqueous solution before addition of the PVP. The soil release polymer used is the nonionic soil release polymer SRP I as described in Section IV.A of liquid compositions (supra). The PVP used in Example 7 has an average molecular weight of about 2,500 (PVP K-12).

| | Examples: | | |
|---|---|---|---|
| Components | 8 (Wt. %) | 9 (Wt. %) | 10 (Wt. %) |
| DTDMAC/MTTMAC* Blend (83%) | 10.48 | 10.48 | 10.48 |
| 1-Tallow(amidoethyl)-2-Tallowimidazoline | 14.3 | 14.3 | 14.3 |
| HCl | 0.85 | 0.85 | 0.85 |
| Poly(2-ethyl-2-oxazoline) | 3.15 | — | — |
| Polyacrylamide (12,000 MW) | — | 3.15 | — |
| Polyacrylamide (22,000 MW) | — | — | 3.15 |
| Perfume | 1.35 | 1.35 | 1.35 |
| Minor Ingredients** | 1.52 | 1.52 | 1.52 |
| Deionized Water | Balance | Balance | Balance |
| | 100.00 | 100.00 | 100.00 |

*Ditallowdimethylammonium chloride/monotallowtrimethylammonium chloride.
**Minor ingredients as given in Example 1.

EXAMPLE 8

The composition of Example 8 is made similarly to that of Example 5, except that the PVP is replaced by poly(2-ethyl-2-oxazoline). This dye transfer inhibitor has an average molecular weight of about 50,000, and is available from Aldrich Chemical Company, Milwaukee, Wis.

EXAMPLES 9–10

The composition of Examples 9 and 10 are made similarly to that of Example 5, except that the PVP is replaced by polyacrylamide. The polyacrylamide used in Example 9 has an average molecular weight of about 12,000, while the polyacrylamide used in Example 10 has an average molecular weight of about 22,000. Both types of polyacrylamide are available from Polysciences, Warrington, Pa.

| Components | Example 11 (Wt. %) |
|---|---|
| 1-Tallow(amidoethyl)-2-Tallowimidazoline Ester | 22.0 |
| PVP K-15 | 8.0 |
| HCl | 1.25 |
| Perfume | 1.35 |
| Minor Ingredients** | 0.4 |
| Deionized Water | Balance |
| | 100.00 |

**Minor ingredients as given in Example 1.

EXAMPLE 11

The composition of Example 11 is made similarly to that of Example 5, except that the softener active blend is replaced by 1-tallow(amidoethyl)-2-tallowimidazoline ester.

| | Examples: | | |
|---|---|---|---|
| Components | 12 (Wt. %) | 13 (Wt. %) | 14 (Wt. %) |
| Hard-tallow DEQA(1) | 7.5 | — | 9 |
| Soft-tallow DEQA(1) | — | 23.5 | — |
| HCl (25%) | 0.112 | 0.336 | 0.97 |
| Soil Release Polymer(2) | 0.17 | 0.5 | 0.5 |
| Perfume | 0.4 | 1.20 | 1.3 |
| Monoester(3) | 0.7 | 2.2 | 0.7 |
| Ethanol | 1.3 | 4 | 1.5 |
| 1-Tallow(amidoethyl)-2-Tallowimidazoline Ester | — | — | 14.3 |
| PVP K-30 | 1 | 3.15 | — |
| PVP K-15 | — | — | 3.0 |
| Minor Ingredients(4) | 0.32 | 0.67 | 0.6 |
| Water | Balance | Balance | Balance |
| | 100.00 | 100.00 | 100.00 |

(1)Di(tallowoyloxyethyl)dimethyl ammonium chloride and di(tallowoyloxyethyl)methylamine.
(2)SRP I of Example 7.
(3)Mono(tallowoyloxyethyl)hydroxyethyl dimethylammonium chloride.
(4)Minor ingredients as given in Example 1, and also including Dow Corning Antifoam 2210 ®.

EXAMPLE 12

The composition of Example 12 is made by adding PVP with mixing to a vessel containing deionized water, HCl, antifoam, and soil release polymer at about 79–85° C. DEQA is heated to about 85–90° C. to melt and is then added with high shear mixing to the aqueous solution. Viscosity adjuster (e.g., calcium chloride) is added to the mixture, followed by addition of perfume. The mixture is milled and then cooled to about 18–27° C. Remaining minor ingredients are post-added at ambient temperature.

EXAMPLE 13

The composition of Example 13 is made similarly to that of Example 12 except that the aqueous solution to which the PVP is added is at about 77° C. and the DEQA is preheated to about 71° C.

EXAMPLE 14

The composition of Example 14 is made similarly to that of Example 12, except that molten 1-tallow(amidoethyl)-2-tallowimidazoline ester is premixed with the hot DEQA before addition to the aqueous solution.

| | Examples: | |
|---|---|---|
| Components | 15 (Wt. %) | 16 (Wt. %) |
| DTDMAC/MTTMAC* Blend (83%) | 10.48 | 10.48 |
| 1-Tallow(amidoethyl)-2-Tallowimidazoline | 14.3 | 14.3 |
| PVNO (50,000 MW) | 1.0 | — |
| PVNO (25,000 MW) | — | 1.0 |
| HCl | 0.85 | 0.85 |
| Perfume | 1.35 | 1.35 |
| Minor Ingredients** | 1.52 | 1.52 |

-continued

| Components | Examples: 15 (Wt. %) | 16 (Wt. %) |
|---|---|---|
| Deionized Water | Balance | Balance |
| | 100.00 | 100.00 |

*Ditallowdimethylammonium chloride/monotallowtrimethyl-ammonium chloride.
**Minor ingredients as given in Example 1.

EXAMPLES 15 AND 16

The compositions of Examples 15 and 16 are made similarly to that of Example 5, except that the PVP is replaced by poly(4-vinylpyridine N-oxide) (PVNO).

Examples of Fabric Conditioning Substrate Articles

The following fabric conditioning compositions and substrate articles, when added to the tumble dryer with the wet laundry load, show dye transfer inhibition in the subsequent wash cycle.

| Components | Example 17 (Wt. %) |
|---|---|
| DTDMAC | 80.00 |
| Calcium Bentonite Clay | 4.00 |
| PVP K-15 | 16.00 |
| Total | 100.00 |

EXAMPLE 17

Preparation of the Coating Mix

An approximately 200 gram batch of the coating mix is prepared as follows. An amount of about 160 g of ditallowdimethylammonium chloride (DTDMAC) is melted at 80° C. The calcium bentonite clay (about 8 g of Bentolite L, available from Southern Clay Co.) is slowly added to the mixture with high shear mixing. During the mixing, the mixture is kept molten in a boiling water bath. About 32 g0 of PVP K-15 is then slowly added to the mixture with high shear mixing, and the formula is mixed until the mixture is smooth and homogenous.

Preparation of Fabric Conditioning Sheets

The coating mixture is applied to preweighed nonwoven substrate sheets of about 9 inch×11 inch (approximately 23 cm×28 cm) dimensions. The substrate sheets are comprised of 70% 3-denier, 1 9/16 inch (approximately 4 cm) long rayon fibers with 30% polyvinyl acetate binder. The substrate weight is about 16 g per square yard (about 1.22 g/sheet). A small amount of formula is placed on a heated metal plate with a spatula and then is spread evenly with a wire metal rod. A nonwoven substrate sheet is placed on the metal plate to absorb the coating mixture. The sheet is then removed from the heated metal plate and allowed to cool to room temperature so that the coating mix can solidify. The sheet is weighed to determine the amount of coating mixture on the sheet. The target coating is 2.0 g per sheet. If the weight is in excess of the target weight, the sheet is placed back on the heated metal plate to remelt the coating mixture and remove some of the excess. If the weight is under the target weight, the sheet is also placed on the heated metal plate and more coating mixture is added.

| Components | Example 18 (Wt. %) |
|---|---|
| Octadecyldimethylamine | 11.89 |
| $C_{12-14}$ Fatty Acid | 8.29 |
| $C_{16-18}$ Fatty Acid | 10.69 |
| DTDMAMS | 19.32 |
| Sorbitan Monostearate | 19.32 |
| Clay | 3.86 |
| PVP K-15 | 26.62 |
| Total | 100.00 |

EXAMPLE 18

Preparation of the Coating Mix and Fabric Conditioning Sheets

A first blend of about 11.89 parts octadecyldimethylamine (Ethyl Corporation), 8.29 parts $C_{12-14}$ fatty acid (The Procter & Gamble Co.), and 10.69 parts $C_{16-18}$ fatty acid (Emery Industries, Inc.) are melted together at 80° C., and a second blend of about 19.32 parts sorbitan monostearate (Mazer Chemicals, Inc.) and 19.32 parts ditallowdimethylammonium methylsulfate, DTDMAMS, (Sherex Chemical Co.) are melted together to form the softener component of the composition, during which time the mixture is kept molten in a boiling water bath. The calcium bentonite clay (3.86 parts Bentolite L, available from Southern Clay Co.) is then lowly added to the mixture while high shear mixing. An amount of bout 26.62 parts of PVP K-15 is then added in small portions, and he formula is mixed until the mixture is smooth and completely homogenous.

The coating mixture is applied to preweighed nonwoven subtrate sheets as in Example 17. The target coating is 2.33 g per sheet. Each sheet contains about 1.62 g of softener, about 0.09 g of clay, and about 0.62 g of PVP.

| Components | Examples: 19 (Wt. %) | 20 (Wt. %) |
|---|---|---|
| Octadecyldimethylamine | 10.88 | 11.63 |
| $C_{12-14}$ Fatty acid | 7.58 | — |
| $C_{16-18}$ Fatty Acid | 9.78 | 20.59 |
| DTDMAMS | 17.67 | 20.20 |
| Sorbitan Monostearate | 17.67 | 20.20 |
| Clay | 3.54 | 5.99 |
| PVP K-15 | 15.00 | 18.93 |
| Perfume/Cyclodextrin Complex | 15.44 | — |
| Free Perfume | 2.44 | 2.46 |
| Total | 100.00 | 100.00 |
| Coating Wt. per Sheet (g) | 2.55 | 2.52 |

EXAMPLE 19

Preparation of Coating Mix and Fabric Conditioning Sheets

The softener mixture of Example 19 is prepared similarly to that of Example 18. However, the coating mixture of Example 19 contains both perfume in the free state and perfume complexed with β-cyclodextrin. The free perfume provides the initial perfume odor to the dry fabrics, while the complexed perfume is used to provide the freshness impression to the re-wetted fabrics. The target coating is 2.55 g per sheet. Each sheet contains about 1.62 g of softener, about 0.09 g of clay, 0.38 g of PVP, about 0.40 g of perfume/cyclodextrin complex, and about 0.062 g of free perfume.

EXAMPLE 20

Preparation of Coating Mix and Fabric Conditioning Sheets

A fabric conditioning composition and a dryer-added fabric conditioning article comprising a rayon nonwoven fabric substrate [having a weight of 1.22 g per 99 sq. in. (approximately 639 $cm^2$)] are prepared in the following manner.

A premixture is prepared by admixing about 11.63 parts octadecyldimethylamine with about 20.59 parts $C_{16-18}$ fatty acid at about 75° C. Then about 20.20 parts sorbitan monostearate and about 20.20 parts ditallowdimethylammonium methylsulfate are added with high shear mixing at about 75° C. After the addition is completed and a sufficient period of mixing time has elapsed, about 5.99 parts of Bentolite L particulate clay is added slowly while maintaining the high shear mixing action. Then about 18.93 parts of PVP powder is added with mixing. Finally about 2.46 parts of perfume is added to complete the preparation of the fabric conditioning composition.

The flexible substrate, comprised of about 70% 3-denier, 1$\frac{9}{16}$ inch long (approximately 4 cm) rayon fibers and about 30% polyvinyl acetate binder, is impregnated by coating one side of a continuous length of the substrate and contacting it with a rotating cylindrical member which serves to press the liquified mixture into the interstices of the substrate. The amount of fabric conditioning mixture applied is controlled by the flow rate of the mixture and/or the line speed of the substrate. The substrate is passed over several chilled tension rolls which help solidify the conditioning mixture. The substrate sheet is about 9 inches wide (approximately 23 cm) and is perforated in lines at about 11 inch intervals (approximately 28 cm) to provide detachable sheets. Each sheet is cut with a set of knives to provide three evenly spaced parallel slits averaging about 4 inches in length (approximately 10 cm). In this Example 18, the application rate is adjusted to apply about 2.52 g of coating mixture per sheet. Each sheet contains about 1.83 g of softener, about 0.15 g of clay, about 0.48 g of PVP and about 0.062 g of perfume.

Examples of Solid, Particulate Fabric Softening Compositions

The following solid softener compositions can be reconstituted into liquid compositions. When added to the rinse cycle of an automatic laundering operation, these liquid compositions show dye transfer inhibition in the subsequent wash cycle.

The solid particulate compositions herein effectively disperse following simple addition to lukewarm water with gentle agitation (e.g., manual shaking). Improved results are obtained by using higher temperatures and/or effective mixing conditions, e.g., high shear mixing, milling, etc. However, even the mild conditions provide acceptable aqueous compositions.

| Components | Example 21 (Wt. %) |
|---|---|
| Sorbitan Monostearate | 74.3 |
| Cetyltrimethylammonium Bromide | 24.8 |
| PVP K-15 | 0.9 |
| Total | 100.0 |

EXAMPLE 21

A homogeneous mixture of cetyltrimethylammonium bromide (CTAB) and sorbitan monostearate (SMS) is obtained by melting SMS (about 165 g) and mixing CTAB (about 55 g) therein. The solid softener product is prepared from this "co-melt" by one of two methods: cryogenic grinding (at about −78° C.) to form a fine powder, or (b) prilling to form particles of particle size of from about 50 to about 500 $\mu$m.

Cryogenic Grinding

The molten mixture is frozen in liquid nitrogen and ground in a Waring blender to a fine powder. The powder is placed in a dessicator and allowed to warm to room temperature, yielding a fine, free flowing powder (granule).

Prilling

The molten mixture (at about 88° C.) falls about 1.5 inches at a rate of about 65 g/min. onto a heated (about 150° C.) rotating (about 2,000 rpm) disk. As the molten material is spun off the disk and air cooled (as it radiates outward), neat-spherical granule particles form with particle size of from about 50 to about 500 $\mu$m.

About 1 g of PVP K-15 powder of average MW of about 10,000 is added to and intimately mixed with about 110 g of the solid particulate softener composition to make the solid, particulate fabric softening composition of Example 21.

This solid, particulate fabric softener can be added directly to the rinse, or can be used to prepare a liquid softener. To make a conventional liquid softener about 111 g of solid particles is dispersed in about 889 g of warm water at about 40° C. and vigorously shaken for approximately 5 minutes. Upon cooling, the aqueous product remains in a homogeneous emulsified, or dispersed, state. Addition of this liquid product or the solid, particulate product to the rinse cycle of a washing process provides fabric softening and dye transfer inhibition characteristics.

| Components | Example 22 (Wt. %) |
|---|---|
| DEQA(1) | 60.0 |
| PGMS(2) | 17.4 |
| Coconut Choline Ester Chloride | 8.6 |
| PVNO | 10.5 |
| Minor Ingredients (Perfume; Antifoam) | 3.5 |
| Total | 100.0 |

(1)Di(tallowoyloxyethyl)dimethyl ammonium chloride.
(2)Polyglycerol monostearate having a trade name of Radiasurf ® 7248.

EXAMPLE 22

About 60 parts of molten DEQA is mixed with about 8.6 parts of molten coconut choline ester chloride and about 17.4 parts of molten PGMS. About 10.5 parts of powdered PVNO of average molecular weight of about 50,000 is then added. The active mixture is cooled and solidified by pouring onto a metal plate, and then ground. Trace of solvent is removed by a Rotovapor® (about 2 hrs. at about 40–50° C. at maximum vacuum). The resulting active powder is ground and sieved to make the solid, particulate fabric softening product. The reconstitution of the powder into a liquid softener product is made as follows: About 900 g of tap water is heated to about 35° C. (about 95° F.). About 10 g of antifoam and about 2.5 g of perfume are added to the water. About 96.5 g of the active powder is sprinkled on the water under continuous agitation. This resulting product is cooled by means of a cooling spiral prior to storage.

What is claimed is:

1. A liquid rinse added or solid particulate rinse added fabric softening composition capable of reducing the transfer of dyes during subsequent wash cycles, comprising:

I. from about 3% to about 90% of fabric softening agent; and

II. from about 0.03% to about 80% of water-soluble polymeric dye transfer inhibitor, selected from the group consisting of:

(A) polymers, which are not enzymes, with one or more monomeric units containing at least one =N—C(=O)— group having an average molecular weight of from about 500 to about 100,000;

(B) polymers with one or more monomeric units containing at least one N-oxide group having an average molecular weight of from about 500 to about 1,000,000;

(C) polymers containing both =N—C(=O)— and N-oxide groups of (A) and (B);

(D) mixtures thereof; and wherein the composition is essentially free of aerosol propellant, bleach, sachets containing an active ingredient, and anionic surfactant; and additionally when the composition is a liquid composition, and the fabric softening agent is methyl-1-oleylamidoethyl-2-oleylimidazolinium methosulfate, or analogous agent, the composition is essentially free of large amounts of highly ethoxylated material, propylated material, or mixtures thereof.

2. The fabric softening composition according to claim 1 wherein said dye transfer inhibitor is polyvinylpyrrolidone.

3. The fabric softening composition according to claim 1 wherein said dye transfer inhibitor is poly(4-vinylpyridine N-oxide).

4. Liquid rinse-added composition according to claim 1 comprising:

I. from about 3% to about 50% fabric softening agent; and

II. from about 0.03% to about 25% of said dye transfer inhibitor.

5. The liquid composition according to claim 4 wherein said dye transfer inhibitor is (A) having an average molecular weight of from about 500 to about 40,000.

6. The liquid composition according to claim 5 wherein said dye transfer inhibitor has an average molecular weight of from about 1,000 to about 30,000.

7. The liquid composition according to claim 4 wherein said dye transfer inhibitor is polyvinylpyrrolidone.

8. The liquid composition according to claim 4 wherein said dye transfer inhibitor is (B) having an average molecular weight of from about 1,000 to about 100,000.

9. The liquid composition according to claim 8 wherein said dye transfer inhibitor has an average molecular weight of from about 2,000 to about 100,000.

10. The liquid composition according to claim 4 wherein said dye transfer inhibitor is poly(4-vinylpyridine N-oxide).

11. The process of making the liquid composition of claim 4 comprising the following steps:

(a) Adding dye transfer inhibitor to the water seat, the water seat having a temperature of from about 100° F. to about 190° F.;

(b) Adding the fabric softening agent into the water seat with agitation;

(c) Optionally adding a viscosity control agent; and (d) Cooling the composition.

12. The process of claim 11 in the dye transfer inhibitor is added after Step (b) but before Step (c).

13. The solid particulate composition according to claim 1 comprising:

I. from about 20% to about 90% fabric softening agent; and

II. from about 0.1% to about 80% said dye transfer inhibitor.

14. The solid particulate composition according to claim 13 wherein the fabric softening agent is from about 30% to about 70% and said dye transfer inhibitor is from about 0.5% to about 25%.

15. The solid, particulate composition according to claim 13 wherein said dye transfer inhibitor is (A) having an average molecular weight of from about 500 to about 40,000.

16. The solid, particulate composition according to claim 15 wherein said dye transfer inhibitor has an average molecular weight of from about 1,000 to about 30,000.

17. The solid, particulate composition according to claim 13 wherein said dye transfer inhibitor is polyvinylpyrrolidone.

18. The solid, particulate composition according to claim 13 wherein said dye transfer inhibitor is (B) having an average molecular weight of from about 1,000 to about 100,000.

19. The solid, particulate composition according to claim 18 wherein said dye transfer inhibitor has an average molecular weight of from about 2,000 about 100,000.

20. The solid, particulate composition according to claim 18 wherein said dye transfer inhibitor is poly(4-vinylpyridine N-oxide).

* * * * *